United States Patent

Knieling et al.

(10) Patent No.: US 6,739,151 B2
(45) Date of Patent: May 25, 2004

(54) METHOD OF PRODUCING A QUARTZ GLASS TUBE AND DRILL BODY FOR PERFORMING THE METHOD

(75) Inventors: Dagobert Knieling, Hanau (DE); Rainer Schleich, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 145 days.

(21) Appl. No.: 09/949,017

(22) Filed: Sep. 7, 2001

(65) Prior Publication Data

US 2002/0069672 A1 Jun. 13, 2002

(30) Foreign Application Priority Data

Sep. 8, 2000 (DE) .......................................... 100 44 715

(51) Int. Cl.⁷ ............................................ C03B 23/045
(52) U.S. Cl. ............................. 65/109; 65/282; 65/283; 65/292
(58) Field of Search ........................... 65/109, 108, 86, 65/87, 174, 276, 277, 279, 282, 283, 292, 296, DIG. 9; 76/108.1, 108.2

(56) References Cited

U.S. PATENT DOCUMENTS 3,486,870 A  * 12/1969 Vervaart et al. ............. 65/32.5
5,590,729 A  * 1/1997 Cooley et al. ............... 175/432
5,785,729 A  * 7/1998 Yokokawa et al. ........... 65/385

FOREIGN PATENT DOCUMENTS

JP            3-247525         11/1991

OTHER PUBLICATIONS

Espacenet Abstract for JP 3–247525 (Nov. 5, 1991).

* cited by examiner

Primary Examiner—Sean Vincent
(74) Attorney, Agent, or Firm—Tiajoloff & Kelly; Andrew L. Tiajoloff

(57) ABSTRACT

In a known method of producing a quartz glass tube (22), a cylinder (21) of quartz glass which rotates about a rotational axis (27) is continuously fed to a heating zone (24), softened therein in portions starting from one end, and the softened portion (25) is drawn over a drill head (1) of a drill body arranged to be coaxial to the rotational axis and is thereby formed into the quartz glass tube (22). Starting therefrom, in order to indicate a method for forming a cylinder of quartz glass into a hollow cylinder of quartz glass having an inner bore that is as flawless as possible and straight and dimensionally stable, it is suggested according to the invention that a drill body should be used with a drill head (1) having a contact surface (2) of a convex curvature facing the cylinder (21), preferably a spherically shaped contact surface (2). The drill body according to the invention is characterized by a drill head (1) which has a contact surface (2) of a convex curvature (2).

13 Claims, 1 Drawing Sheet

METHOD OF PRODUCING A QUARTZ GLASS TUBE AND DRILL BODY FOR PERFORMING THE METHOD

Figure 1:
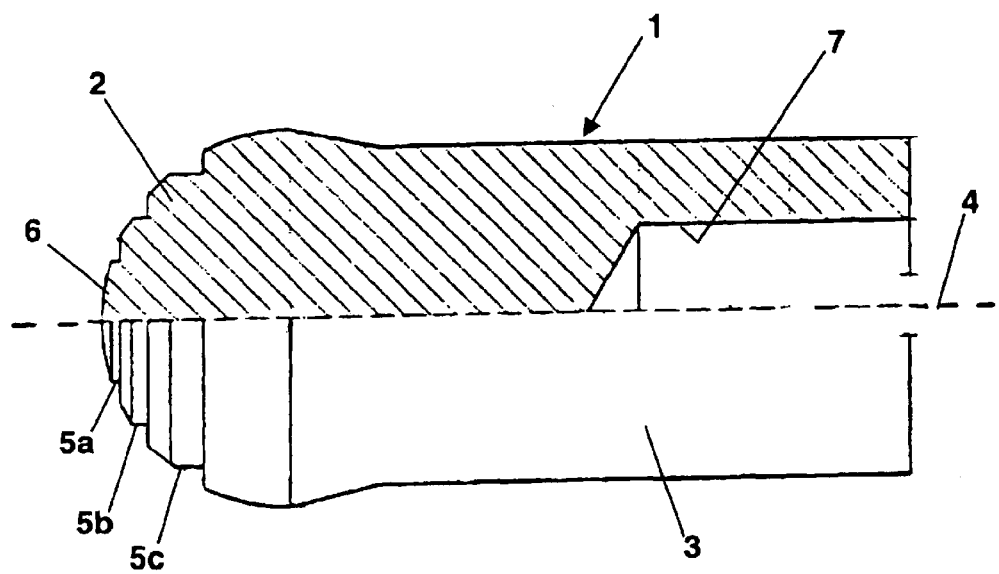

The present invention relates to a method for producing a quartz glass tube by feeding a cylinder of quartz glass rotating about a rotational axis continuously to a heating zone, softening the cylinder therein in portions starting from one end, and drawing the softened portion over a drill head of a drill body arranged to be coaxial to the rotational axis, thereby forming the portion into the quartz glass tube.

Furthermore, the present invention relates to a drill body for forming a cylinder of quartz glass into a quartz glass tube, the drill body comprising a drill head which penetrates into the cylinder to be formed and which is held by a drill shaft.

A method and an apparatus of this type are described in JP-A 3-247525. In the method described therein, a solid cylinder of quartz glass is formed into a hollow cylinder of quartz glass by the measures that the solid cylinder of quartz glass while rotating about its longitudinal axis is continuously fed to a furnace, starting at one end, the solid cylinder is softened therein in zones and the softened portion is pressed against a fixed drill body arranged within the rotational axis and is drawn thereover. The drill body comprises a conically shaped drill head which is held on a long shaft.

During the forming process considerable forces act on the drill head. The rotating glass material of the solid quartz-glass cylinder can produce static friction forces acting on the drill head at one side, said forces deflecting the drill head laterally out of the axis of rotation. Moreover, the drill shaft may easily bend because of its length, thereby tilting the drill head out of the horizontal, so that the upper part of the drill head face is no longer in engagement with the quartz glass. In the known method these effects yield a bore that is not straight enough and a bore diameter that is insufficient in its dimensional stability. Radial grooves are produced in the bore surface by a glass material resting on the drill head at one side.

It is therefore the object of the present invention to indicate a method for forming a cylinder of quartz glass into a hollow cylinder of quartz glass having an inner bore that is as flawless as possible and is straight and dimensionally stable, and to provide a drill body therefor.

As for the method, this object starting from the above-mentioned method is achieved according to the invention in that a drill body is used with a drill head having a contact surface of a convex curvature facing the cylinder.

In the method according to the invention, use is made of a drill head which has a contact surface of a convex curvature. During the forming process the contact surface is always in planar engagement with the softened glass material of the cylinder to be formed. To this end the contact surface has a convex curvature. As a result, even upon a deflection of the drill head—for instance because of a deflection of the drill rod on which the drill head is held—the planar contact with the softened glass material is maintained. This guarantees that, on the circumference of the drill head, friction forces that are always of about the same magnitude are active in rotationally symmetrical fashion around the axis of rotation, thereby preventing the formation of unilaterally acting static friction forces that might deflect the drill head even further. Thanks to the continuous planar contact, the quartz glass displaced in the inner bore of the quartz-glass tube is smoothly molded off on the edge zone of the convex contact surface, leaving no defects in the bore surface. Grooves are thereby avoided. What is essential is that the contact surface has a convex curvature extending in symmetry with the axis of rotation. Ideally, the curvature is spherical; this means that it forms part of a spherical surface. Deviations from the spherical shape towards the surface of an ellipsoid or paraboloid are possible.

The cylinder to be formed is in general a solid cylinder. However, the method according to the invention is also suited for enlarging the inner bore of a hollow cylinder.

Preferably, use is made of a drill head with a spherically shaped contact surface. Upon deflection of the drill head from the axis of rotation, the spherical contact surface will always remain over its whole surface in engagement with the softened quartz-glass material, independently of the direction of deflection, so that frictional forces that are always of the same magnitude in terms of rotational symmetry act on the circumference of the drill head and the quartz glass displaced in the inner bore is smoothly molded off on the edge zone of the ball or sphere.

It has turned out to be of particular advantage when the contact surface is provided with recesses. Gases entrapped in the softened quartz glass or formed during the forming process can be discharged through the recesses or at least be distributed in a more uniform manner.

Preferably, recesses which extend in concentric fashion relative to the axis of rotation are provided on the drill head. These enable the gases to expand and permit a uniform distribution of the gases around the circumference of the drill head. This avoids a situation where the drill head partially "floats" because of gas bubbles in the softened quartz glass, thereby losing the desired full-surface contact with the glass material. Thanks to the uniform distribution of the gases the static friction forces that are uniformly distributed around the circumference of the drill head are maintained so that straightness of the bore as well as dimensional stability of the bore diameter are ensured.

As for the drill body, the above-mentioned object starting from the drill body of the above-mentioned type is achieved according to the invention in that the drill head has a contact surface of a convex curvature.

The drill body according to the invention has a contact surface of a convex curvature. As a consequence, during the forming process the contact surface is always in planar engagement with the softened glass material of the cylinder head to be formed. As a result, even upon a deflection of the drill head—for instance because of a deflection of the drill rod on which the drill head is held—the planar contact with the softened glass material is maintained. This guarantees that, on the circumference of the drill head, friction forces that are always of about the same magnitude are active in rotationally symmetrical fashion around the axis of rotation, thereby preventing the formation of unilaterally acting static friction forces that might deflect the drill head even further. Thanks to the continuous planar contact, the quartz glass which is displaced in the inner bore of the quartz-glass tube is smoothly molded off on the edge zone of the convex contact surface, leaving no defects in the bore surface. Grooves are thereby avoided. What is essential is that the contact surface has a convex curvature extending in symmetry with the axis of rotation. Ideally, the curvature is spherical; this means that it forms part of a spherical surface. Deviations from the spherical shape towards the surface of an ellipsoid or paraboloid are possible.

In a preferred embodiment of the drill body according to the invention, the drill head comprises a spherically shaped contact surface. Upon deflection of the drill head from the axis of rotation, the spherical contact surface will always remain over its whole surface in engagement with the softened quartz-glass material, independently of the direction of deflection, so that frictional forces that are always of the same magnitude in terms of rotational symmetry act on the circumference of the drill head and the quartz glass displaced in the inner bore is smoothly molded off on the edge zone of the ball or sphere.

It has turned out to be of particular advantage when the contact surface is provided with recesses. Gases entrapped in the softened quartz glass or formed during the forming process can be discharged through the recesses or at least be distributed in a more uniform manner.

Preferably, the recesses extend in concentric fashion relative to the axis of rotation. Recesses formed in this way enable the entrapped gases to expand and permit their uniform distribution around the circumference of the drill head. This avoids a situation where the drill head partially "floats" because of gas bubbles within the softened quartz glass, thereby losing the desired full-surface contact with the glass material. Thanks to the uniform distribution of the gases, the static friction forces that are uniformly distributed around the circumference of the drill head are maintained so that straightness of the bore as well as dimensional stability of the bore diameter are ensured.

In a particularly preferred embodiment of the drill body according to the invention, the drill head is provided with a spherical surface and concentrically recessed steps. The number of the concentrically recessed steps depends on the diameter of the inner bore to be produced and on the amount of gases formed during the forming process.

It has turned out to be useful when a drill head is provided with at least one cooling channel. A coolant for discharging heat from the area of the drill head can be passed through the cooling channel during the forming process.

Figure 2:
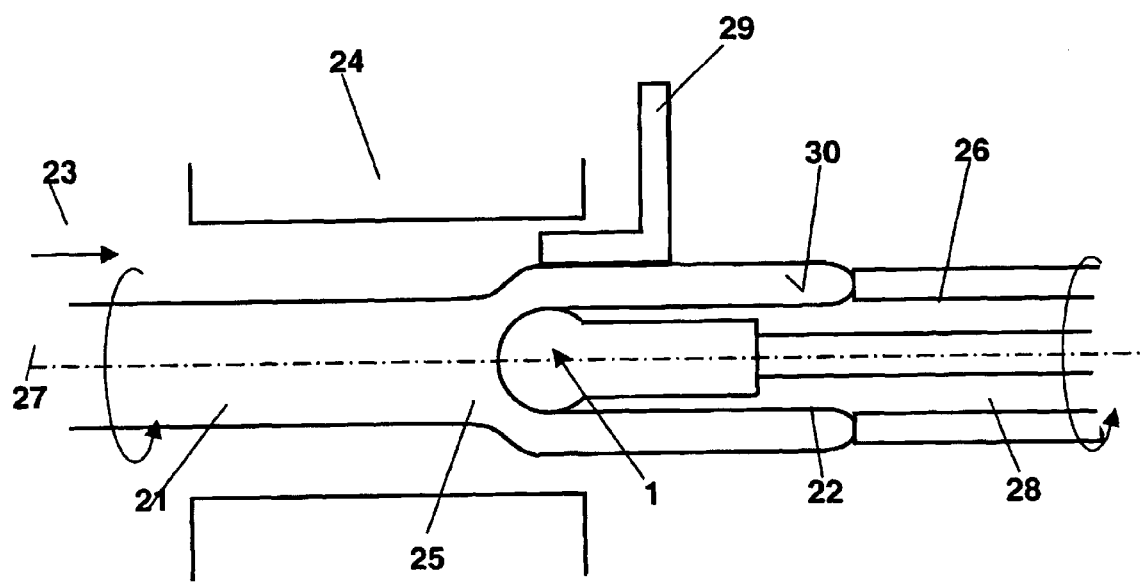

The invention shall now be explained in more detail with reference to an embodiment and a patent drawing. The drawing is a schematic illustration showing in detail in:

FIG. 1: a drill body according to the invention with a spherical head in a side view, partly in section;

FIG. 2: a device for performing the method of the invention using the drill head illustrated in FIG. 1.

In FIG. 1, reference numeral 1 is assigned on the whole to a drill head of graphite. The drill head 1 is substantially shaped in the form of a cylinder with a contact surface in the form of a hemisphere 2. The diameter of the hemisphere 2 is 60 mm and thus slightly larger than the diameter in the cylindrical portion 3, which is 55 mm. The hemisphere 2 and the cylindrical portion 3 are made from one piece. The hemisphere 2 is provided with three steps 5a, 5b, 5c that are concentrically pierced or recessed with respect to the longitudinal axis 4. The heights of the steps when viewed in the direction of the longitudinal axis 4 are—in the sequence of 5a, 5b, 5c—1.6 mm, 2.8 mm, 5.5 mm. The width of the steps when viewed in a direction transverse to the longitudinal axis 4 is 3.5 mm each.

The front part 6 of the hemisphere 2 that is without any steps has a diameter of 20 mm. An inner thread 7 is provided in the cylindrical portion 3 for fastening the drill head 1 onto a drill shaft (not shown in the figure).

FIG. 2 schematically illustrates a device for forming a solid cylinder 21 into a hollow cylinder 22. The solid cylinder 21 has an outer diameter of 90 mm; the hollow cylinder 22 formed therefrom has an outer diameter of 120 mm and an inner diameter of 60 mm.

While rotating about its longitudinal axis, the solid cylinder 21 is continuously slid in the direction of arrow 23 into a resistance furnace 24 which surrounds the solid cylinder 21 in annular fashion. In the resistance furnace the solid cylinder 21 is heated to a temperature of about 2,100° C., so that the cylinder in a softening portion 25 has a viscosity so low that it can be formed into the hollow cylinder 22. To this end the drill head 1, which has been explained in more detail with reference to FIG. 1, is used by drawing the solid cylinder 21 in the softened portion over the drill head 1. The head is held on a long drill shaft 26 so that the longitudinal axis thereof extends within the axis of rotation 27. For drawing the hollow cylinder 22 over the drill head 1, the front end of the cylinder has attached thereto a blowpipe 28 rotating about the axis of rotation 27. An additional form tool 29 is provided for forming the outer diameter.

Thanks to the hemispherical shape of the drill head 1, it is guaranteed, independently of the deflection of the drill head 1, that the static friction between the drill head 1 and the rotating quartz glass in the softened portion 25 is always distributed in a uniform manner around the circumference of the drill head 1. A further lateral deflection is thereby prevented, surface defects in the inner bore 30 are minimized, any deviation from the straight bore extension is prevented, and the dimensional stability of the diameter is improved over the whole length of the inner bore 30. Since the drill head 1 is always in full surface contact with the softening portion 25, and since the quartz glass displaced on the hemisphere of the drill head 1 is smoothly molded off on the edge zone of the hemisphere, grooves are avoided in the inner bore 30. The concentrically recessed steps in the hemispherical surface permit an expansion and uniform distribution of gases which are entrapped in the quartz glass or are formed during the forming process. Therefore, the drill head does not float in part, so that the static friction forces that evenly act on the circumference are maintained, and straightness as well as dimensional stability of the inner bore 30 are ensured.

What is claimed is:

1. A method of producing a quartz glass tube, said method comprising:
    feeding a cylinder of quartz glass rotating about a rotational axis continuously to a heating zone;
    softening said cylinder in said heating zone starting from one end; and
    drawing a softened portion of said cylinder over a drill head of a drill body arranged to be coaxial to said rotational axis, thereby forming said portion into said quartz glass tube;
    said drill head having a contact surface facing the softened portion generally in the direction of said rotational axis, said contact surface being of a convex curvature relative to the rotational axis.

2. The method according to claim 1, wherein the contact surface of the drill head is a portion of a spherical form.

3. The method according to claim 1 wherein said contact surface has recesses therein.

4. The method according claim 2 wherein said contact surface has recesses therein.

5. A method of producing a quartz glass tube, said method comprising:
    feeding a cylinder of quartz glass rotating about a rotational axis continuously to a heating zone;
    softening said cylinder in said heating zone starting from one end; and
    drawing a softened portion of said cylinder over a drill head of a drill body arranged to be coaxial to said rotational axis, thereby forming said portion into said quartz glass tube;

said drill head having a contact surface of a convex curvature facing said cylinder;

wherein said contact surface has recesses therein; and wherein said recesses are disposed so as to extend concentrically relative to said rotational axis.

6. A method of producing a quartz glass tube, said method comprising:

feeding a cylinder of quartz glass rotating about a rotational axis continuously to a heating zone;

softening said cylinder in said heating zone starting from one end; and drawing a softened portion of said cylinder over a drill head of a drill body arranged to be coaxial to said rotational axis, thereby forming said portion into said quartz glass tube;

said drill head having a contact surface of a convex curvature facing said cylinder;

wherein the contact surface of the drill head is a portion of a spherical form;

wherein said contact surface has recesses therein;

wherein said recesses are disposed so as to extend concentrically relative to said rotational axis.

7. A method of producing a quartz glass tube, said method comprising:

feeding a cylinder of quartz glass rotating about a rotational axis continuously to a heating zone;

softening said cylinder in said heating zone starting from one end; and drawing a softened portion of said cylinder over a drill head of a drill body arranged to be coaxial to said rotational axis, thereby forming said portion into said quartz glass tube;

said drill head having a contact surface of a convex curvature facing said cylinder;

wherein said contact surface of the drill head is a spherical surface having concentrically disposed recessed steps therein.

8. The method according to claim 1 wherein said drill head is formed with at least one cooling channel therein.

9. The method according to claim 3, wherein said recesses are disposed so as to extend concentrically relative to said rotational axis.

10. The method according to claim 4, wherein said recesses are disposed so as to extend concentrically relative to said rotational axis.

11. The method according to claim 1 wherein said contact surface of the drill head is a spherical surface having concentrically disposed recessed steps therein.

12. The method according to claim 1, wherein the contact surface of the drill head is a portion of a spherical form deviated toward an ellipsoid surface or a paraboloid surface.

13. The method according to claim 1, wherein the convex curvature of the contact surface of the drill head extends in symmetry with the axis of rotation.

* * * * *